(No Model.)
C. D. BAIR.
PLOW.
No. 531,619.          Patented Jan. 1, 1895.
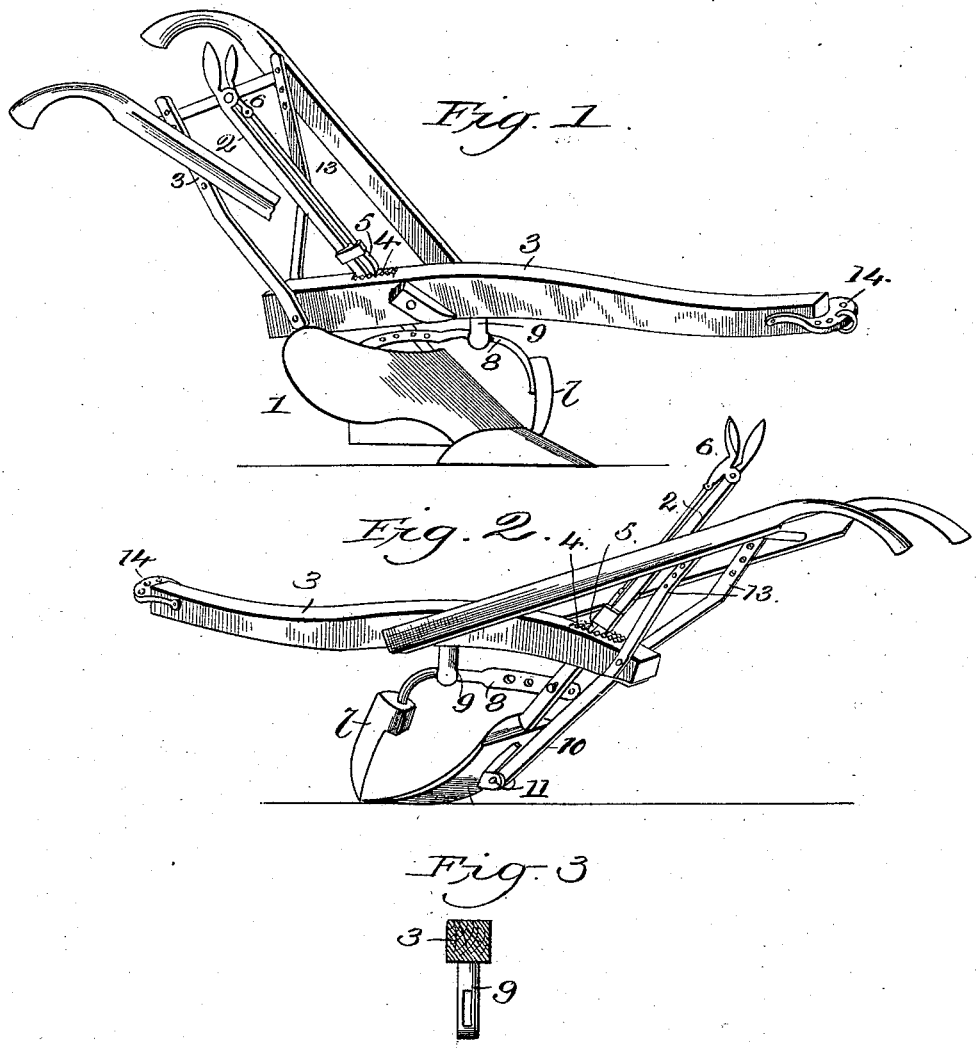
Witnesses
J. W. Reynolds
Chas. S. Hyer
Inventor
Charles Dunham Bair
By John Wedderburn
Attorney

UNITED STATES PATENT OFFICE.

CHARLES DUNHAM BAIR, OF PATRIOT, INDIANA, ASSIGNOR OF ONE-HALF TO DAVID B. WALLACE, OF WARSAW, KENTUCKY.

PLOW.

SPECIFICATION forming part of Letters Patent No. 531,619, dated January 1, 1895.

Application filed January 10, 1894. Serial No. 496,372. (No model.)

*To all whom it may concern:*

Be it known that I, CHARLES DUNHAM BAIR, a citizen of the United States, and a resident of Patriot, in the county of Switzerland and State of Indiana, have invented certain new and useful Improvements in Plows; and I do hereby declare the following to be a full, clear, and exact description of the invention, such as will enable others skilled in the art to which it appertains to make and use the same.

This invention relates to plows, and has for its object to provide adjustable mechanism therewith to adjust the plow and the different parts to different kinds of soil and different kinds of work without the necessity of adjusting the harness or employing different hames for the purpose of regulating the draft to increase or decrease the same.

With these and other objects in view the invention consists of the construction and arrangement of the several parts which will be more fully hereinafter described and claimed.

In the drawings: Figure 1 is a perspective view of the improved device applied to a mold board plow. Fig. 2 is a similar view of the invention applied to a shovel plow. Fig. 3 is a detail view.

Similar numerals of reference are employed to designate corresponding parts of the several views.

Referring to the drawings: the numeral 1 designates the plow blade which may be of the ordinary mold board form or a shovel plow, as shown, and has attached thereto a lever 2, which passes through the plow beam 3, and at the point where the said lever passes through the beam a ratchet plate or sector 4 is mounted, in which works a trigger 5. The trigger 5 is manipulated by a trigger lever 6, and the various slots in the round plate allows the trigger to be moved forward or backward to any notch in the ratchet plate. As the plow blade or mold is moved and adjusted in this wise any draft for the plow can be obtained by a single movement of the lever.

In front of the plow mold is mounted a cutter bar 7, which is adjustably secured on the front end of a cutter arm 8 moving in a slot in the depending ear 9 as shown in Fig. 3, and having the rear end thereof flattened and provided with a series of openings to adjustably attach the same to the lever 2 so that it can be moved forward or backward and by means of its adjustable attachment to the front of the said arm 8 it can be raised or lowered as may be found desirable. Furthermore, the said cutter and cutter arm are entirely detachable for the purpose of removing the cutter in the event that it becomes worn or a different plow is substituted and attached to the main lever.

The rear portion of the plow proper is adjustably attached to the plow post or standard 10 by a pivot 11, which is removable so that it will operate in harmony with the plow lever in a movement to increase or decrease the draft of the plow.

It will be seen that all the changes necessary to be made can be attained by a single movement of the main lever and by moving the trigger forward in the ratchet plate a deeper draft is obtained. The reverse is true and a shallow draft is obtained. This operation of changing the draft can be quickly accomplished and the necessity of employing a particular kind of hames is obviated, the entire change or movement automatically adjusting itself to suit any kind of harness and by such adjustment of the plow a natural motion with the team consisting of either one or two horses can be obtained. Between the handles 12 of the plow is an adjustable brace 13, which is fastened to the plow beam so as to raise or lower the handles to suit the height of the person using the plow. The main lever 2 can be pushed forward by removing the fastenings which only comprise two bolts, and the said lever without any loss of time. The clevis 14 is so adjusted at right angles to the plow beam that the amount of land to be cut can be regulated by using a turning plow and by adjusting to the right hand side of the clevis more land can be taken in by the plow and to the left hand less land.

The plow is also adjusted so that a right or left hand plow can be used on the same post, and the lever adjustment works the same with the level or mold board plow as it does with the shovel plow. In applying the mold board plow of course the attachment to the post may be made in any suitable manner so long as the intended operation of the device is preserved.

Having thus described the invention, what is claimed as new is—

In combination with a plow beam having handles, of adjustable braces connected with said handles and plow beam, the main lever extending through the plow beam, the plow blade attached to the lower end of said lever, a post to which the plow blade is movably connected and a movable cutter bar in front of the plow blade adjustably attached to the said main lever, substantially as and for the purpose specified.

In testimony whereof I have signed this specification in the presence of two subscribing witnesses.

CHARLES DUNHAM BAIR.

Witnesses:
OTIS W. OLCOTT,
DAVID B. WALLACE.